US 11,753,248 B2

(12) United States Patent
Miyamoto et al.

(10) Patent No.: US 11,753,248 B2
(45) Date of Patent: Sep. 12, 2023

(54) PICKING FACILITY

(71) Applicant: Daifuku Co., Ltd., Osaka (JP)

(72) Inventors: Masaya Miyamoto, Tokyo (JP); Hiroaki Haruta, Tokyo (JP)

(73) Assignee: Daifuku Co., Ltd., Osaka (JP)

( * ) Notice: Subject to any disclaimer, the term of this patent is extended or adjusted under 35 U.S.C. 154(b) by 511 days.

(21) Appl. No.: 17/007,057

(22) Filed: Aug. 31, 2020

(65) Prior Publication Data

US 2021/0061569 A1   Mar. 4, 2021

(30) Foreign Application Priority Data

Sep. 2, 2019 (JP) .................................. 2019-159679

(51) Int. Cl.
| | |
|---|---|
| *B65G 1/137* | (2006.01) |
| *B65G 1/04* | (2006.01) |
| *B65G 47/49* | (2006.01) |
| *B65G 47/50* | (2006.01) |
| *B65G 47/52* | (2006.01) |

(52) U.S. Cl.
CPC ......... *B65G 1/1376* (2013.01); *B65G 1/0492* (2013.01); *B65G 1/1371* (2013.01); *B65G 1/1378* (2013.01); *B65G 47/49* (2013.01); *B65G 47/50* (2013.01); *B65G 47/52* (2013.01)

(58) Field of Classification Search
CPC .. B65G 1/1376; B65G 1/0492; B65G 1/1371; B65G 1/1378; B65G 47/49; B65G 47/50; B65G 47/52; B65G 1/0485; B65G 1/1373; B65G 43/08; B65G 60/00; B65G 61/00; B65G 2201/02; B65G 2209/00
See application file for complete search history.

(56) References Cited

U.S. PATENT DOCUMENTS

2015/0073589 A1 * 3/2015 Khodl ................ B65G 1/1375
700/218

FOREIGN PATENT DOCUMENTS

| EP | 3591597 A1 * | 1/2020 |
|---|---|---|
| JP | 2012162376 A * | 8/2012 |
| JP | 2012162376 A | 8/2012 |
| JP | 2018012586 A * | 1/2018 |
| JP | 201942828 A | 3/2019 |
| JP | 2019042828 A * | 3/2019 |
| WO | 2017110499 A1 | 6/2017 |
| WO | WO-2017110499 A1 * | 6/2017 |

* cited by examiner

*Primary Examiner* — Gene O Crawford
*Assistant Examiner* — Abby A Jorgensen
(74) *Attorney, Agent, or Firm* — THE WEBB LAW FIRM

(57) ABSTRACT

In a picking facility, if both a first picking operation and a second picking operation are performed based on order information, a third container is transported from a housing portion to a second picking portion, a fourth container is transported from the housing portion to the second picking portion, after the second picking operation has been performed, the fourth container in which a target article has been housed by the second picking operation is transported as a second container to a first picking portion, a first container is transported from the housing portion to the first picking portion, and, after the first picking operation has been performed, the second container in which the target articles have been housed by the first picking operation and the second picking operation is transported to a shipping portion.

8 Claims, 8 Drawing Sheets

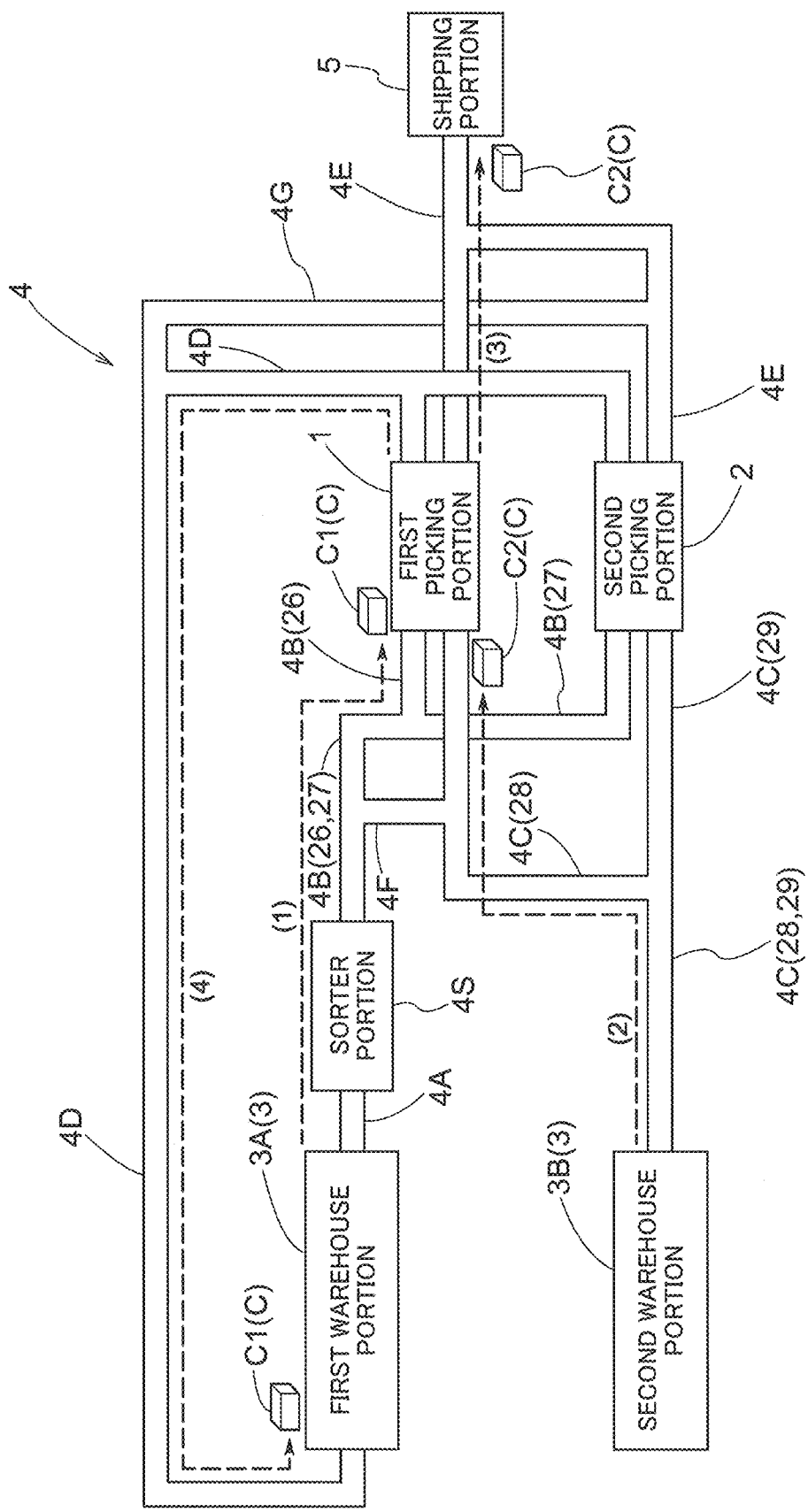

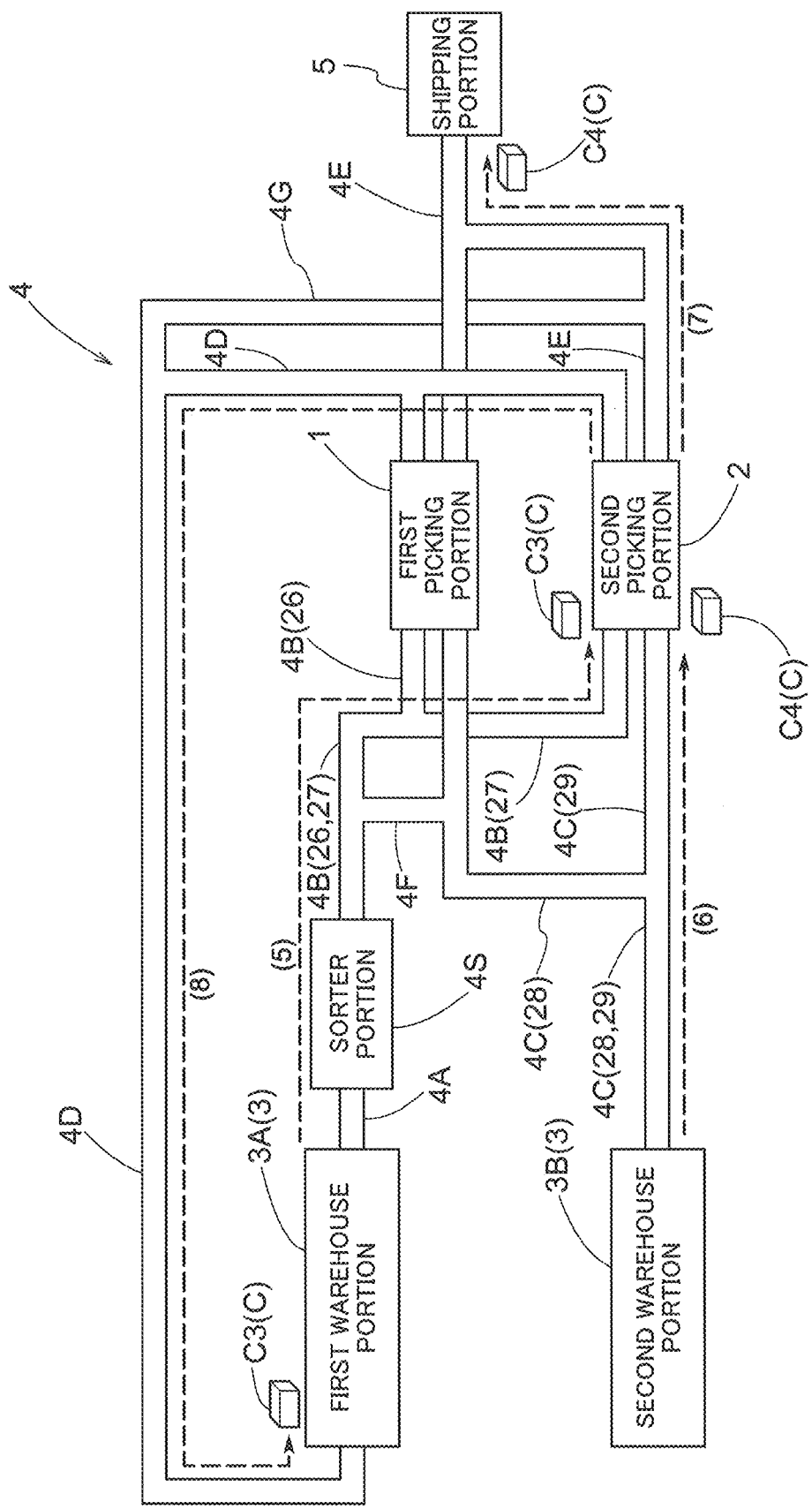

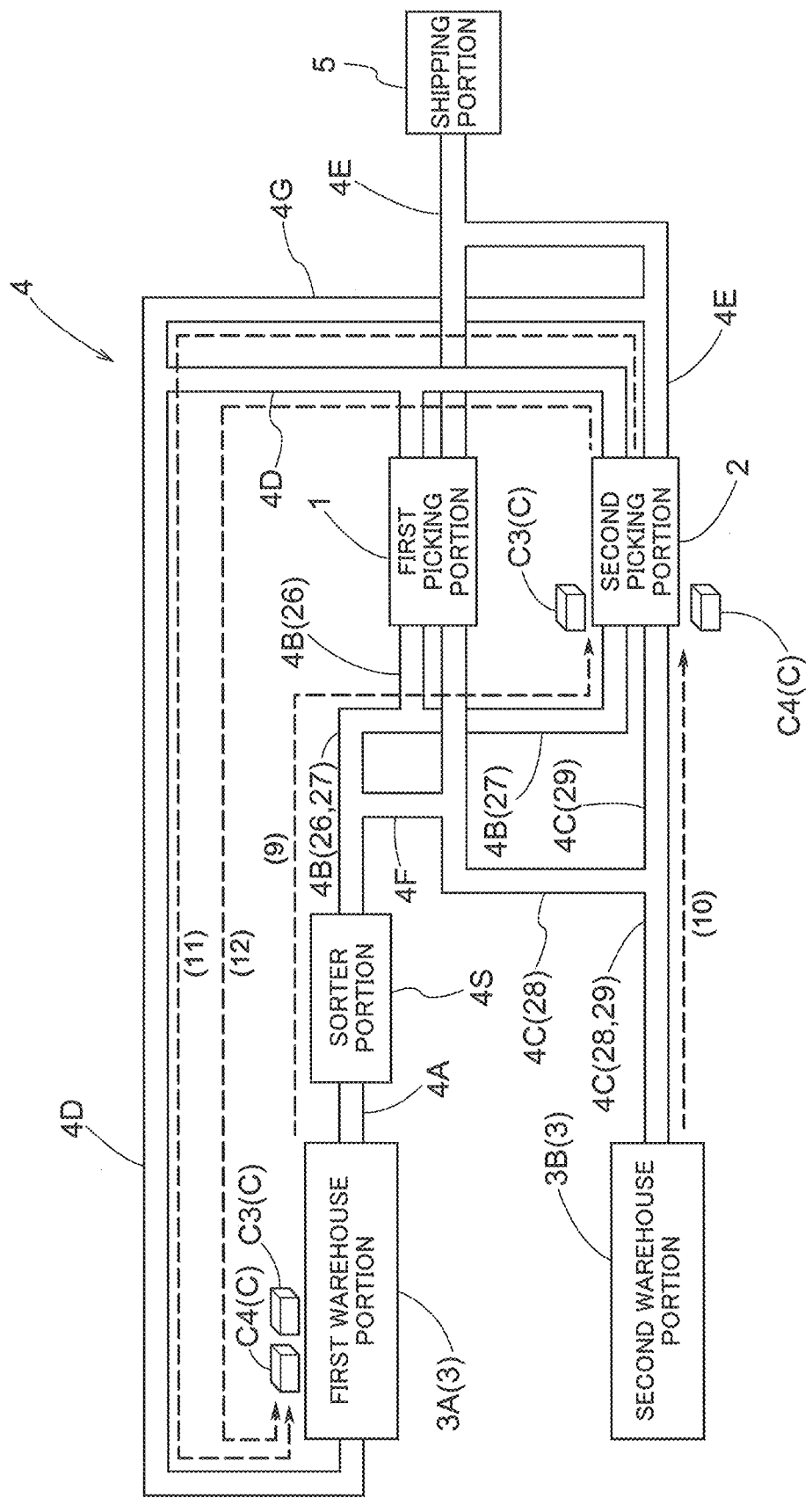

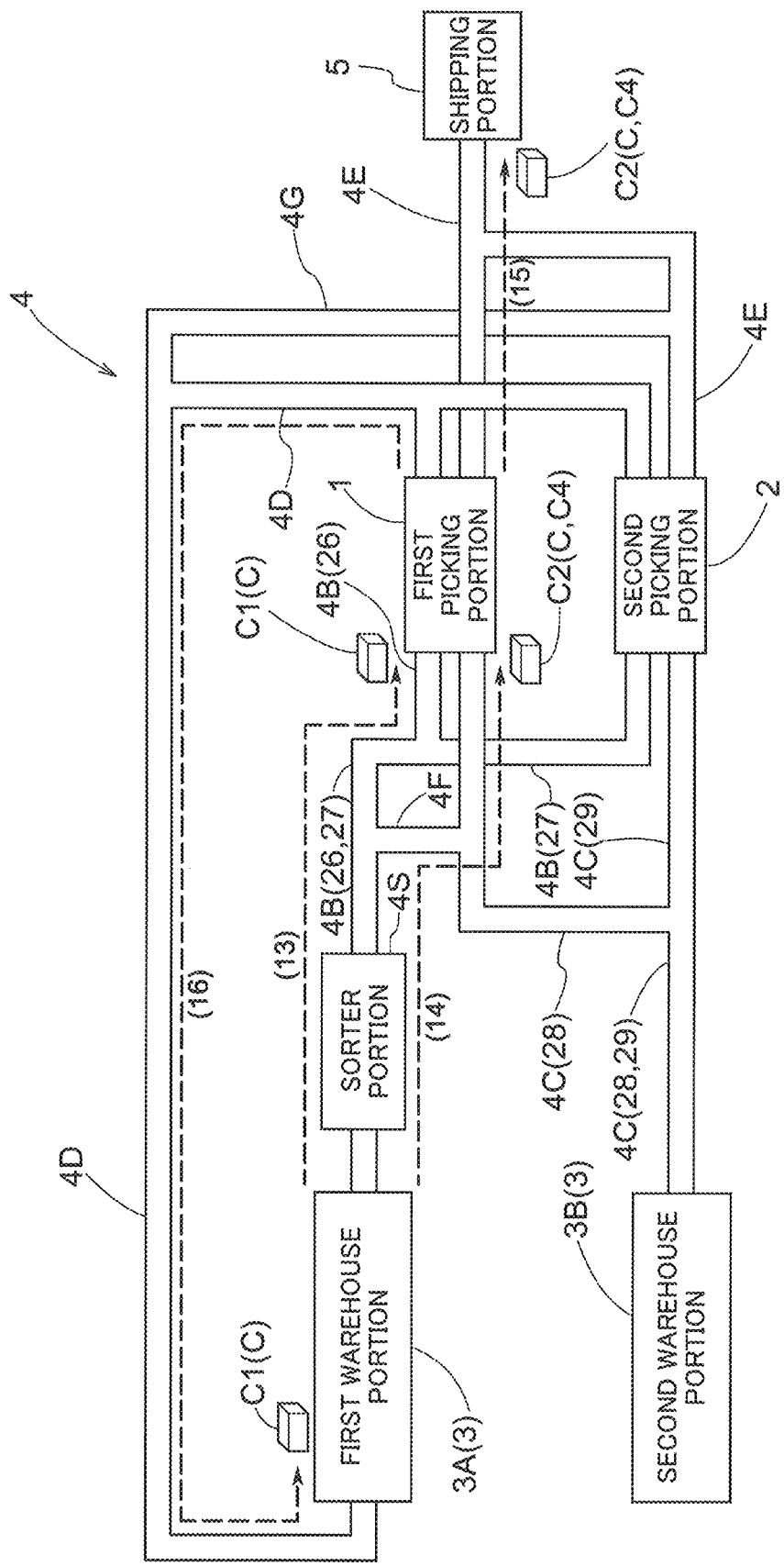

PICKING FACILITY

CROSS-REFERENCE TO RELATED APPLICATION

This application claims priority to Japanese Patent Application No. 2019-159679 filed Sep. 2, 2019, the disclosure of which is hereby incorporated by reference in its entirety.

BACKGROUND OF THE INVENTION

1. Field of the Invention

The present invention relates to a picking facility including picking portions at which picking operations are performed.

2. Description of the Related Art

As such a picking facility, the picking facility described in JP 2019-042828A (Patent Document 1) and the picking facility described in JP 2012-162376A (Patent Document 2) are known, for example. In the following, the reference numerals or terms in parentheses in "Description of the Related Art" are those described in the related art documents. The picking facility described in Patent Document 1 includes a picking portion at which a robot (transfer device 3) performs a picking operation, a first conveyor 1 that transports a first container C1, and a second conveyor 2 that transports a second container C2. At the picking portion, an operation is performed as the picking operation in which a target article that has been taken out from the first container C1 is housed in the second container C2 based on order information. For the picking facility described in Patent Document 2, if the target articles indicated in one piece of the order information are separately housed in a plurality of containers (article storage containers U), an operation is performed in which, using one of the plurality of containers as a shipping container, the target articles are taken out from the containers other than the shipping container, and housed in the shipping container.

SUMMARY OF THE INVENTION

A picking facility such as the one described in Patent Document 1 may include a picking portion (hereinafter referred to as a first picking portion) at which an operator performs a picking operation, in addition to a picking portion (hereinafter referred to as a second picking portion) at which a robot performs a picking operation. For example, if there is any target article for which a picking operation cannot be performed by a robot due to the shape or the size thereof, a picking operation may be performed for the target article by the operator at the first picking portion. In such a case, if target articles that are indicated in one piece of order information include those for which a picking operation can be performed by the robot, and those for which a picking operation cannot be performed by the robot, the target articles indicated in the one piece of order information may be separately housed in a plurality of containers. Also, if target articles that are indicated in one piece of order information are separately housed in a plurality of containers in this manner, in addition to the picking operation, an operation may be performed in which, using one of the plurality of containers as a shipping container, the target articles are taken out from the containers other than the shipping container, and housed in the shipping container as described in Patent Document 2, thus gathering the target articles indicated in one piece of order information in one container.

Thus, there is still room for simplification in operations performed in a picking facility when the picking facility includes a first picking portion at which an operator performs a picking operation, and a second picking portion at which a robot performs a picking operation.

Therefore, there is a need for a picking facility that can simplify operations.

A picking facility according to the present disclosure includes: a first picking portion at which an operator performs a first picking operation; a second picking portion at which a robot performs a second picking operation; a housing portion that houses containers; a transport portion that transports the containers; and a control portion that controls the transport portion, wherein the containers include a first container in which articles of an article type to be subjected to the first picking operation are housed, a second container serving as a shipping container, a third container in which articles of an article type to be subjected to the second picking operation are housed, and a fourth container, the first picking operation is an operation in which, based on order information serving as information indicating a target article to be shipped, the target article that has been taken out from the first container is housed in the second container, the second picking operation is an operation in which the target article that has been taken out from the third container is housed in the fourth container based on the order information, and the control portion, if only the first picking operation out of the first picking operation and the second picking operation is performed based on the order information, controls the transport portion such that the first container is transported from the housing portion to the first picking portion; the second container is transported from the housing portion to the first picking portion; and, after the first picking operation has been performed, the second container in which the target article has been housed by the first picking operation is transported to a shipping portion; and, if both the first picking operation and the second picking operation are performed based on the order information, controls the transport portion such that the third container is transported from the housing portion to the second picking portion; the fourth container is transported from the housing portion to the second picking portion; after the second picking operation has been performed, the fourth container in which the target article has been housed by the second picking operation is transported as the second container to the first picking portion; the first container is transported from the housing portion to the first picking portion; and, after the first picking operation has been performed, the second container in which the target articles have been housed by the first picking operation and second picking operation is transported to the shipping portion.

According to the present configuration, if the target articles indicated in order information include only articles of an article type to be subjected to the first picking operation, only the first picking operation out of the first picking operation and the second picking operation is performed based on the order information. In this case, the first container in which the articles of the article type to be subjected to the first picking operation are housed, and the second container are transported to the first picking portion. Then, as a result of the first picking operation being performed by the operator in a state in which the first container and the second container are located at the first picking portion, all of the target articles indicated in the order information can be housed in the second container, and the second container in which all of the target articles have been housed can be transported to the shipping portion, where a shipping operation can then be performed for the second container.

If the target articles indicated in order information include articles of an article type to be subjected to the first picking operation and articles of an article type to be subjected to the second picking operation, both the first picking operation and the second picking operation are performed. In such a case, first, the third container in which the articles of the article type to be subjected to the second picking operation are housed, and the fourth container are transported to the second picking portion. Then, as a result of the second picking operation being performed by the robot in a state in which the third container and the fourth container are transported to the second picking portion, the articles of the article type to be subjected to the second picking operation, out of the target articles indicated in the order information, can be housed in the fourth container. After the second picking operation has been performed in this manner, the first container in which the articles of the article type to be subjected to the first picking operation are housed, and the second container are transported to the first picking portion. The second container that is transported to the first picking portion in this case is the fourth container in which the target article has been housed by the second picking operation, and the articles of the article type to be subjected to the second picking operation have already been housed therein. Accordingly, as a result of the first picking operation being performed by the operator in a state in which the first container and the second container are located at the first picking portion, all of the target articles indicated in the order information that include both the articles of the article type to be subjected to the first picking operation and the articles of the article type to be subjected to the second picking operation can be housed in the second container. Then, the second container in which all of such target articles have been housed can be transported to the shipping portion, where a shipping operation can then be performed for the second container.

Thus, according to the present configuration, if both the first picking operation and the second picking operation are performed, the articles of the article type to be subjected to the first picking operation and the articles of the article type to be subjected to the second picking operation can be housed in the same second container in the first picking operation performed at the first picking portion. Accordingly, it is possible to simplify the operations as compared with a case where target articles are gathered in one container after being housed in different containers in the first picking operation and the second picking operation.

BRIEF DESCRIPTION OF THE DRAWINGS

FIG. 6 is a diagram showing the transport of containers in the case of performing the first picking operation.
FIG. 7 is a diagram showing the transport of containers in the case of performing the second picking operation.

FIG. 8 is a diagram showing the transport of containers in the case of performing the first picking operation and the second picking operation.
FIG. 9 is a diagram showing the transport of containers in the case of performing the first picking operation and the second picking operation.

DETAILED DESCRIPTION OF PREFERRED EMBODIMENTS

1. Embodiment

An embodiment of the picking facility will be described with reference to the drawings.

Figure 1:
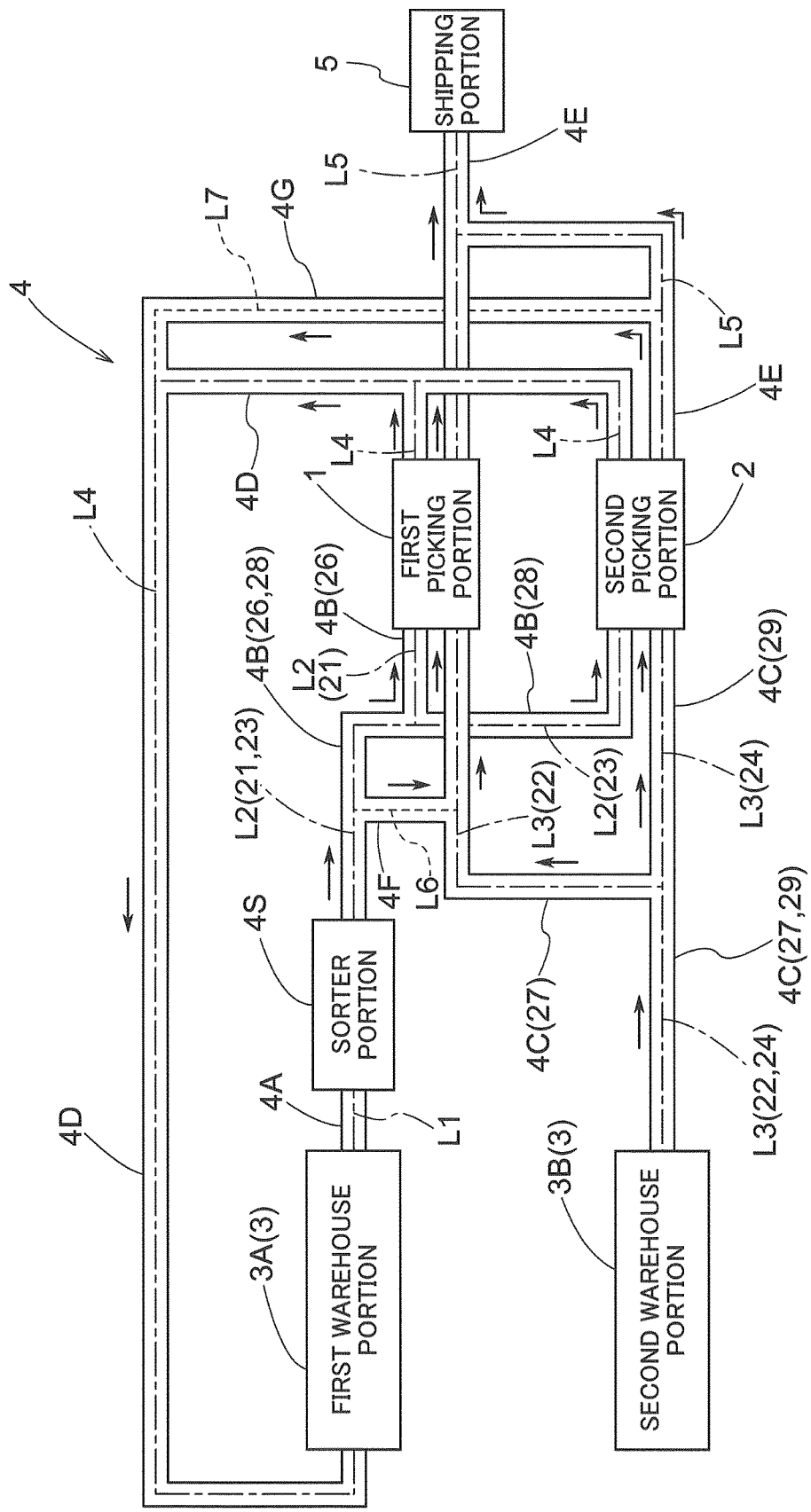
FIG. 1 is a schematic diagram of a picking facility.
Figure 2:
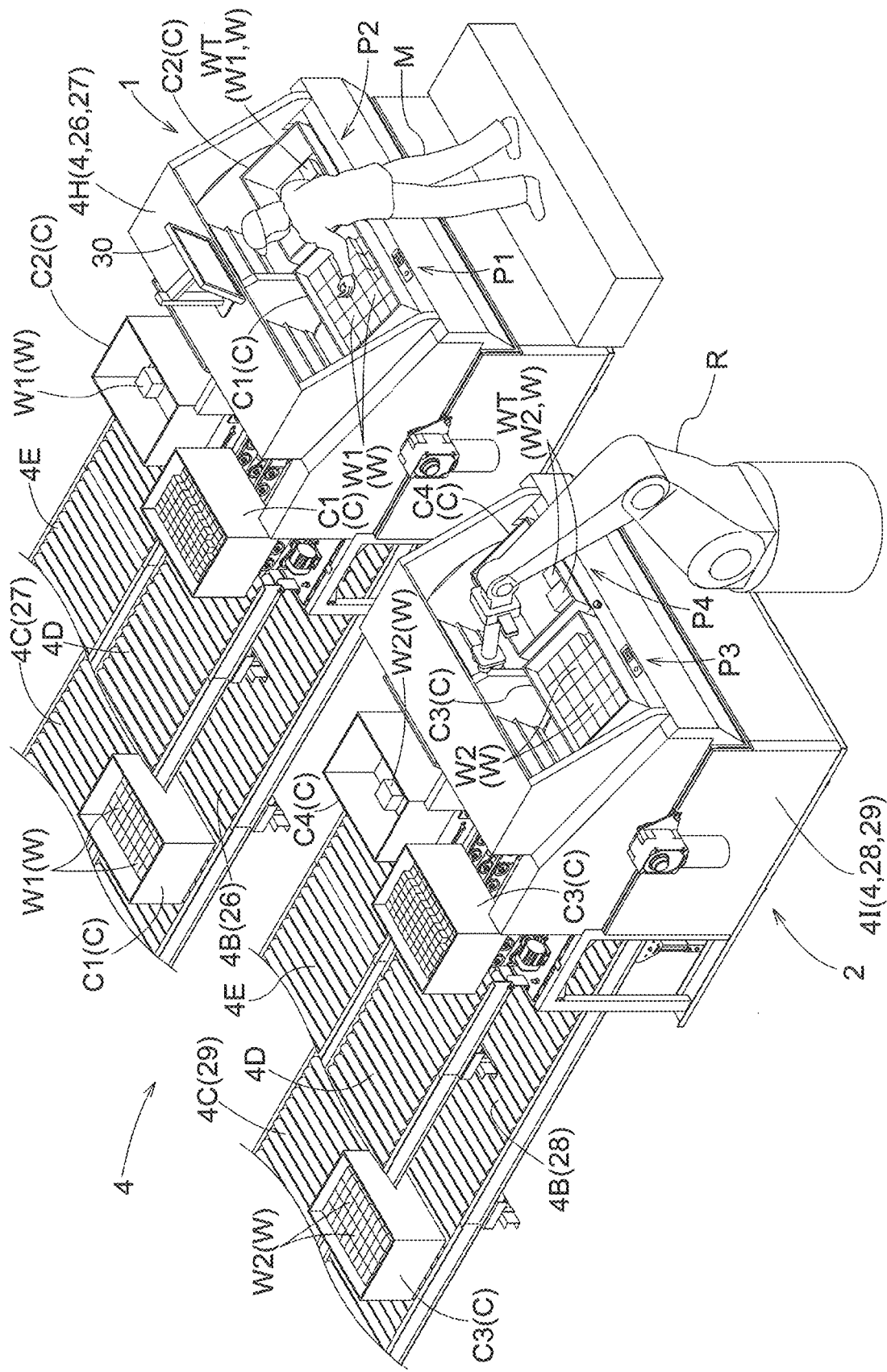
FIG. 2 is a perspective view of a first picking portion and a second picking portion.
Figure 5:
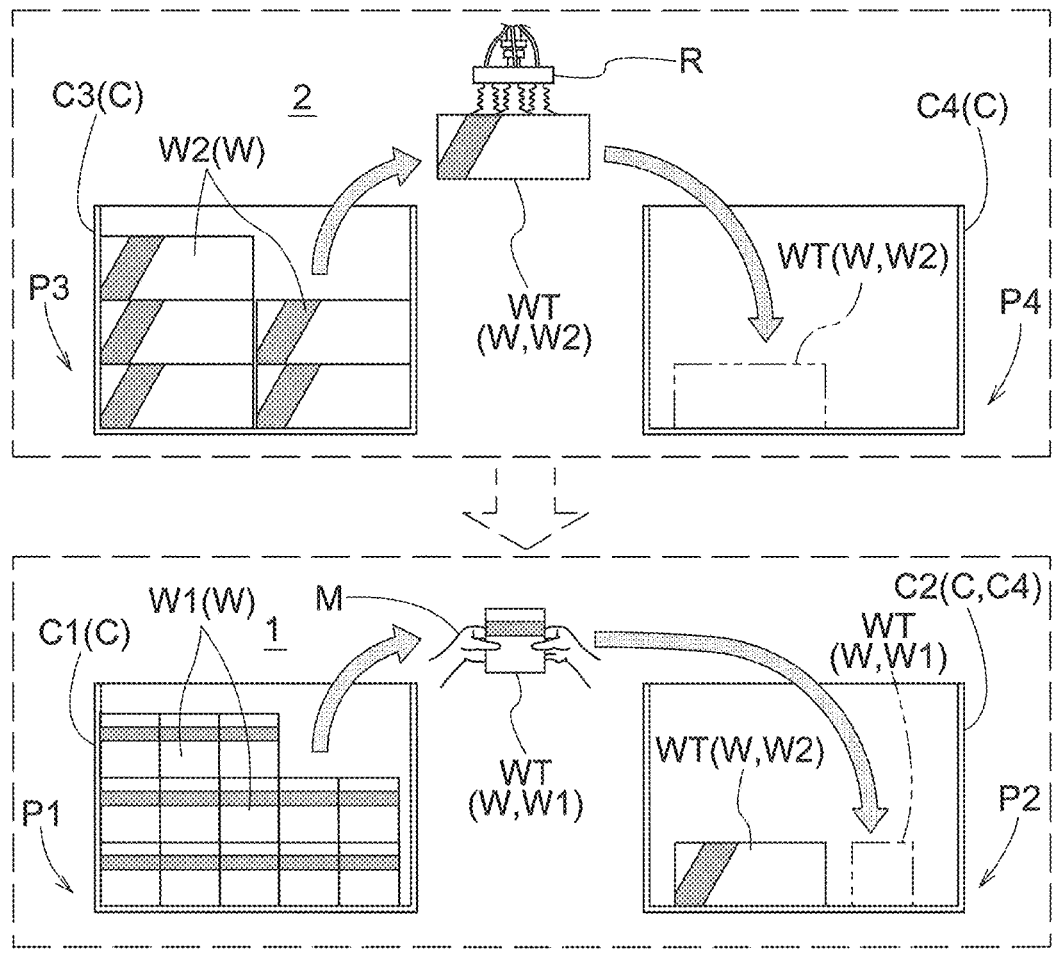
FIG. 5 is a diagram showing a first picking operation and a second picking operation.

As shown in FIG. 1, the picking facility includes a first picking portion 1, a second picking portion 2, an automatic warehouse 3 serving as a housing portion that houses containers C, a transport portion 4 that transports the containers C, and a shipping portion 5 that performs an operation of shipping the containers C from the picking facility. As shown in FIGS. 2 and 5, the first picking portion 1 is a picking portion at which an operator M performs a first picking operation, and the second picking portion 2 is a picking portion at which a robot R performs a second picking operation.

As shown in FIG. 2, the containers C include a first container C1 in which articles W (hereinafter referred to as first articles W1) of an article type to be subjected to the first picking operation are housed, a second container C2 serving as a shipping container C, a third container C3 in which articles W (hereinafter referred to as second articles W2) of an article type to be subjected to the second picking operation are housed, and a fourth container C4. The first picking operation is an operation in which, based on order information serving as information indicating a target article WT to be shipped, the target article WT that has been taken out from the first container C1 is housed in the second container C2. The second picking operation is an operation in which the target article WT that has been taken out from the third container C3 is housed in the fourth container C4 based on the order information.

In the present embodiment, articles W of an article type for which the second picking operation by the robot R can be performed are referred to as the second articles W2, and articles W of an article type for which the second picking operation by the robot R cannot be performed are referred to as the first articles W1. First articles W1 of different article types are housed in different first containers C1, and second articles W2 of different article types are housed in different third containers C3. Note that the article types of the articles W refer to a classification into which various types of articles W that may be handled in the picking facility of the present embodiment are divided according to predefined criteria. In the present embodiment, the article types are classified based on the identification names, identification codes, or the like of articles W that have been divided according to the JAN code, the EAN code, or the like.

In the present embodiment, as shown in FIG. 1, the automatic warehouse 3 includes a first warehouse portion 3A that houses a first container C1 and a third container C3 in each of which the articles W are housed, and a second warehouse portion 3B that houses a second container C2 and a fourth container C4 in each of which no article W is housed. In addition, the first warehouse portion 3A also houses a fourth container C4 in which the target article WT has been housed by the second picking operation. In the present embodiment, foldable containers are used as the containers C, and the folded containers are housed in a stacked state in the second warehouse portion 3B. The containers are each assembled into a box shape by an assembly device (not shown), and retrieved as the second container C2 or the fourth container C4.

The transport portion 4 includes a sorter portion 4S that changes the arrangement sequence of the containers C that are transported, a first transport device 4A that transports the containers C from the first warehouse portion 3A to the sorter portion 4S along a first transport path L1, a second transport device 4B that transports the containers C from the sorter portion 4S to the first picking portion 1 or the second picking portion 2 along a second transport path L2, and a third transport device 4C that transports the containers C from the second warehouse portion 3B to the first picking portion 1 or the second picking portion 2 along a third transport path L3. In addition, the transport portion 4 includes a fourth transport device 4D that transports the containers C from the first picking portion 1 or the second picking portion 2 to the first warehouse portion 3A along a fourth transport path L4, and a fifth transport device 4E that transports the containers C from the first picking portion 1 or the second picking portion 2 to the shipping portion 5 along a fifth transport path L5. Furthermore, the transport portion 4 includes a sixth transport device 4F that transports the containers C along a sixth transport path L6, and a seventh transport device 4G that transports the containers C along a seventh transport path L7. Furthermore, as shown in FIG. 2, the transport portion 4 includes an eighth transport device 4H installed at the first picking portion 1, and a ninth transport device 4I provided at the second picking portion 2.

Figure 3:
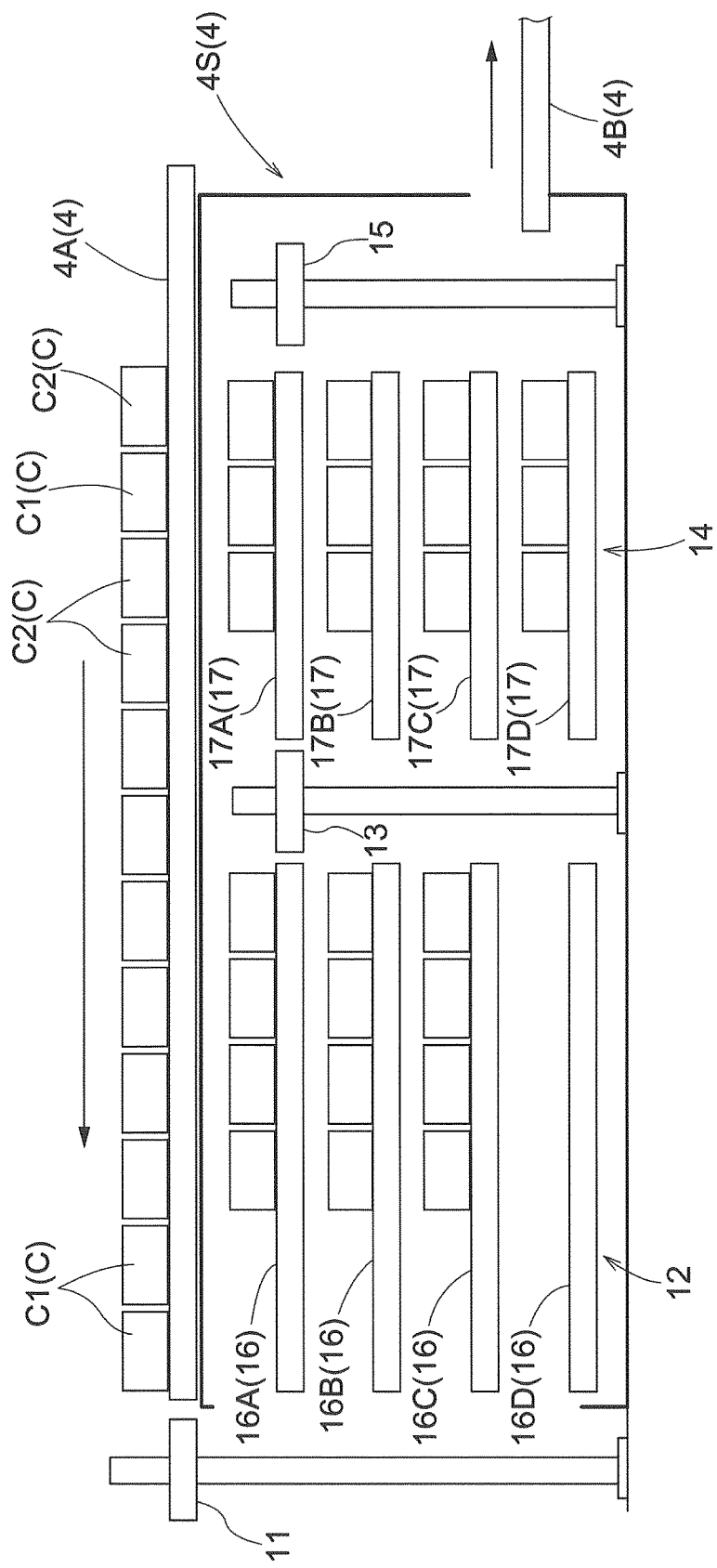
FIG. 3 is a side view of a sorter portion.

As shown in FIG. 3, the sorter portion 4S includes an upstream lifter 11, an upstream accumulation portion 12, an intermediate lifter 13, a downstream accumulation portion 14, and a downstream lifter 15. The upstream accumulation portion 12 includes a plurality of primary sorting conveyors 16. In the present embodiment, the upstream accumulation portion 12 includes four primary sorting conveyors 16, namely, primary sorting first conveyors 16A to 16D. The downstream accumulation portion 14 includes a plurality of secondary sorting conveyors 17. In the present embodiment, the downstream accumulation portion 14 includes four secondary sorting conveyors 17, namely, secondary sorting first conveyors 17A to 17D. The upstream lifter 11 transports the containers C so as to pass each container C that has been received from the first transport device 4A to one of the plurality of primary sorting conveyors 16. The intermediate lifter 13 transports the containers C so as to pass each container C that has been received from one of the plurality of primary sorting conveyors 16 to one of the plurality of secondary sorting conveyors 17. The downstream lifter 15 transports the containers C so as to pass each container C that has been received from one of the plurality of secondary sorting conveyors 17 to the second transport device 4B.

As shown in FIG. 2, the first picking operation is an operation in which a target article WT (first article W1) that has been taken out from the first container C1 located at a first position P1 is housed in the second container C2 located at a second position P2. The first position P1 and the second position P2 are each set midway in the transport path of the eighth transport device 4H. More specifically, the eighth transport device 4H transports the first container C1 so as to pass the first container C1 that has been received from the second transport device 4B to the fourth transport device 4D, and transports the second container C2 so as to pass the second container C2 that has been received from the third transport device 4C to the fifth transport device 4E. Also, the first position P1 is set midway in the transport path for the first container C1 of the eighth transport device 4H, and the second position P2 is set midway in the transport path for the second container C2 of the eighth transport device 4H.

The second picking operation is an operation in which a target article WT (second article W2) that has been taken out from the third container C3 located at a third position P3 is housed in the fourth container C4 located at a fourth position P4. The third position P3 and the fourth position P4 are each set midway in the transport path of the ninth transport device 4I. To describe more specifically, the ninth transport device 4I transports the third container C3 so as to pass the third container C3 that has been received from the second transport device 4B to the fourth transport device 4D, and transports the fourth container C4 so as to pass the fourth containers C4 that have been received from the third transport device 4C to the fifth transport device 4E. Also, the third position P3 is set midway in the transport path for the third container C3 of the ninth transport device 4I, and the fourth position P4 is set midway in the transport path for the fourth container C4 of the ninth transport device 4I. Note that the first position P1, the second position P2, the third position P3, and the fourth position P4 are set at positions that are different from each other.

As shown in FIGS. 1 and 2, the transport portion 4 includes a first transport portion 26 that transports the first container C1 to the first position P1 along a first path 21, and a second transport portion 27 that transports the second container C2 to the second position P2 along a second path 22 that is at least partially different from the first path 21. In the present embodiment, the first transport portion 26 is composed of the second transport device 4B and the eighth transport device 4H, and the second transport portion 27 is composed of the third transport device 4C and the eighth transport device 4H. In addition, the transport portion 4 includes a third transport portion 28 that transports the third container C3 to the third position P3 along a third path 23, and a fourth transport portion 29 that transports the fourth container C4 to the fourth position P4 along a fourth path 24 that is at least partially different from the third path 23. In the present embodiment, the third transport portion 28 is composed of the second transport device 4B and the ninth transport device 4I, and the fourth transport portion 29 is composed of the third transport device 4C and the ninth transport device 4I.

Figure 4:
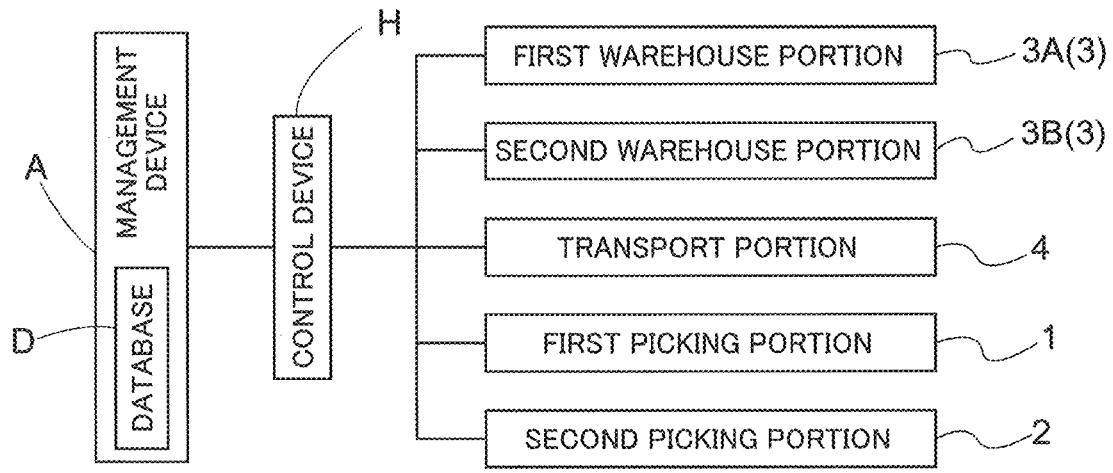
FIG. 4 is a control block diagram.

As shown in FIG. 4, the picking facility includes a control device H that controls the first picking portion 1, the second picking portion 2, the first warehouse portion 3A, the second warehouse portion 3B, and the transport portion 4. The control device H is constituted by a computer including an arithmetic processing unit and a storage unit, for example. A management device A that manages the order information is connected to the control device H. The management device A includes a database D that manages order information that has been created in association with a sort destination such that the type of articles W to be collected and the number thereof are defined based on an order from the sort destination. The order information includes order ID information indicating the order ID, type information indicating the article type of articles W to be shipped to the sort destination, number information indicating the number of articles W for each type, and sequence information indicating the operation sequence. Note that the control device H corresponds to a control portion that controls the transport portion 4.

Also, in the database D of the management device A, operation information indicating whether each article W is the first article W1 or the second article W2 is stored, and relationship information indicating the relationship between the type information of each article W and the operation information is stored. That is, by referring to the database D of the management device A, the control device H can obtain, based on the classification information indicated in order information, information indicating whether the articles W indicated in the order information include only the first articles W1 or the second articles W2, or include both the first articles W1 and the second articles W2. Then, if the articles W indicated in the order information include only the first articles W1, the control device H controls the transport portion 4 so as to perform only the first picking operation out of the first picking operation and the second picking operation based on the order information. If the articles W indicated in the order information include only the second articles W2, the control device H controls the transport portion 4 so as to perform only the second picking operation out of the first picking operation and the second picking operation based on the order information. If the articles W indicated in the order information include both the first articles W1 and the second articles W2, the control device H controls the transport portion 4 so as to perform both the first picking operation and the second picking operation based on the order information.

If only the first picking operation out of the first picking operation and the second picking operation is performed based on the order information, the control device H controls the devices in the following manner. First, the control device H controls the transport portion 4 such that the first container C1 is transported from the first warehouse portion 3A to the first position P1 of the first picking portion 1 (see the arrow (1) in FIG. 6), and the second container C2 is transported from the second warehouse portion 3B to the second position P2 of the first picking portion 1 (see the arrow (2) in FIG. 6). Note that if a plurality of article types of the first articles W1 are indicated in the order information, the control device H controls the transport portion 4 such that a plurality of first containers C1 are sequentially transported to the first position P1 of the first picking portion 1. Next, the control device H controls a display portion 30 (see FIG. 2) provided at the first picking portion 1 so as to display the operation information indicating the details of the first picking operation based on the order information. Thus, by displaying the operation information on the display portion 30, the operator M can perform the first picking operation based on the display on the display portion 30. Then, the control device H controls the transport portion 4 such that, after the first picking operation has been performed, the second container C2 in which the target article WT has been housed by the first picking operation is transported to the shipping portion 5 (see the arrow (3) in FIG. 6), and the first container C1 from which the target article WT has been taken out is transported to the first warehouse portion 3A (see the arrow (4) in FIG. 6).

If only the second picking operation out of the first picking operation and the second picking operation is performed based on the order information, the control device H controls the devices in the following manner. First, the control device H controls the transport portion 4 such that the third container C3 is transported from the first warehouse portion 3A to the third position P3 of the second picking portion 2 (see the arrow (5) in FIG. 7), and the fourth container C4 is transported from the second warehouse portion 3B to the fourth position P4 of the second picking portion 2 (see the arrow (6) in FIG. 7). Note that if a plurality of article types of the second articles W2 are indicated in the order information, the control device H controls the transport portion 4 such that a plurality of third containers C3 are sequentially transported to the third position P3 of the second picking portion 2. Next, the control device H controls the robot R so as to perform the second picking operation based on the order information. Then, the control device H controls the transport portion 4 such that, after the second picking operation has been performed, the fourth container C4 in which the target article WT has been housed by the second picking operation is transported to the shipping portion 5 (see the arrow (7) in FIG. 7), and the third container C3 from which the target article WT has been taken out is transported to the first warehouse portion 3A (see the arrow (8) in FIG. 7).

Also, if both the first picking operation and the second picking operation are performed based on the order information, the control device H controls the devices in the following manner. That is, the control device H performs the second picking operation first, and then performs the first picking operation. For this purpose, first, the control device H controls the transport portion 4 such that the third container C3 is transported from the first warehouse portion 3A to the third position P3 of the second picking portion 2 (see the arrow (9) in FIG. 8), and the fourth container C4 is transported from the second warehouse portion 3B to the fourth position P4 of the second picking portion 2 (see the arrow (10) in FIG. 8). Next, the control device H controls the robot R so as to perform the second picking operation based on the order information. Then, the control device H controls the transport portion 4 such that, after the second picking operation has been performed, the fourth container C4 in which the target article WT has been housed by the second picking operation is transported to the first warehouse portion 3A (see the arrow (11) in FIG. 8), and the third container C3 from which the target article WT has been taken out is transported to the first warehouse portion 3A (see the arrow (12) in FIG. 8). Thus, the fourth container C4 in which the target article WT has been housed by the second picking operation is temporarily transported to the first warehouse portion 3A, and housed therein. Next, when the first picking operation is performed thereafter, the control device H controls the transport portion 4 such that the first container C1 is transported from the first warehouse portion 3A to the first position P1 of the first picking portion 1 (see the arrow (13) in FIG. 9), and the fourth container C4 is transported as the second container C2 from the first warehouse portion 3A to the second position P2 of the first picking portion 1 (see the arrow (14) in FIG. 9). In the second container C2 that is transported to the second position P2, the target article WT (second article W2) has been already housed by the second picking operation, as shown in FIG. 5. Next, the control device H controls the display portion 30 provided at the first picking portion 1 so as to display the operation information indicating the details of the first picking operation based on the order information. Accordingly, the first picking operation by the operator M is performed. Then, the control device H controls the transport portion 4 such that, after the first picking operation has been performed, the second container C2 in which the target articles WT have been housed by the first picking operation and the second picking operation is transported to the shipping portion 5 (see the arrow (15) in FIG. 9), and the first container C1 from which the target article WT has been taken out is transported to the first warehouse portion 3A (see the arrow (16) in FIG. 9).

Thus, if both the first picking operation and the second picking operation are performed based on the order information, the control device H controls the transport portion 4 such that the fourth container C4 in which the target article WT has been housed by the second picking operation is transported as the second container C2 to the first picking portion 1, the first container C1 is transported from the first warehouse portion 3A to the first picking portion 1, and, after the first picking operation has been performed, the second container C2 in which the target articles WT have been housed by the first picking operation and the second picking operation is transported to the shipping portion 5.

Accordingly, a plurality of first containers C1 in which the first articles W1 are housed, a plurality of third containers C3 in which the second articles W2 are housed, and a plurality of containers C that are the fourth containers C4 in which the target articles WT (second articles W2) have been housed by the second picking operation and that are transported as the second containers C2 to the first picking portion 1 are housed in the first warehouse portion 3A. If the first picking operation and the second picking operation are each performed based on a plurality of pieces of order information, the control device H retrieves, in random sequence from the first warehouse portion 3A, a plurality of first containers C1 and a plurality of third containers C3, and the second containers C2, which were originally the fourth containers C4, in each of which the target article WT has been housed by the second picking operation, that all correspond to the plurality of pieces of order information, and transports these containers to the sorter portion 4S. Note that, in the present embodiment, second containers C2 that are retrieved from the first warehouse portion 3A and transported to the sorter portion 4S are all fourth containers C4 in each of which the target articles WT has been housed by the second picking operation.

Then, if a plurality of containers C corresponding to one piece of order information are present, the control device H controls the sorter portion 4S such that the plurality of containers C are successively transported out of the sorter portion 4S. For example, if a plurality of first containers C1 are present as the containers C corresponding to one piece of order information, the control device H controls the sorter portion 4S such that the plurality of first containers C1 are successively transported out of the sorter portion 4S. If a plurality of first containers C1 and one second container C2 are present as the containers C corresponding to one piece of order information, the control device H controls the sorter portion 4S such that the plurality of first containers C1 and the one second container C2 are successively transported out of the sorter portion 4S. If a plurality of third containers C3 are present as the containers C corresponding to one piece of order information, the control device H controls the sorter portion 4S such that the plurality of third containers C3 are successively transported out of the sorter portion 4S. Here, "a plurality of containers C corresponding to one piece of order information are successively transported out of the sorter portion 4S" means that the plurality of containers C are transported out of the sorter portion 4S in a state in which the plurality of containers C are sequentially arranged in the transport direction, and in an arrangement sequence in which any container C corresponding to another piece of order information is not disposed between the plurality of containers C corresponding to one piece of order information. Thus, the control device H controls the sorter portion 4S such that the plurality of first containers C1, the second container C2, and the plurality of third containers C3 are transported out in the arrangement sequence that has been changed such that the plurality of first containers C1, the second container C2, and the plurality of third containers C3 are arranged for each corresponding piece of the order information in the sorter portion 4S.

The control device H transports each of the first containers C1 that have been transported out of the sorter portion 4S to the first position P1 of the first picking portion 1 by the first transport portion 26, and transports each of the second containers C2 that have been retrieved from the second warehouse portion 3B to the second position P2 of the first picking portion 1 by the second transport portion 27. In this case, the control device H controls the timing of transporting the first containers C1 out of the sorter portion 4S, and the timing of retrieving the second containers C2 from the second warehouse portion 3B such that the first container C1 and the second container C2 that correspond to one piece of order information are located at the first position P1 and the second position P2 at the same time at the first picking portion 1.

Also, the control device H transports each of the third containers C3 that have been transported out of the sorter portion 4S to the third position P3 of the second picking portion 2 by the third transport portion 28, and transports each of the fourth containers C4 that have been retrieved from the second warehouse portion 3B to the fourth position P4 of the second picking portion 2 by the fourth transport portion 29. In this case, the control device H controls the timing of transporting the third containers C3 out of the sorter portion 4S and the timing of retrieving the fourth containers C4 from the second warehouse portion 3B such that the third container C3 and the fourth container C4 that correspond to one piece of order information are located at the third position P3 and the fourth position P4 at the same time at the second picking portion 2.

Furthermore, the control device H transports each of the first containers C1 that have been transported out of the sorter portion 4S to the first position P1 of the first picking portion 1 by the first transport portion 26, and transports the second container C2, which was originally the fourth container C4, that has been transported out of the sorter portion 4S to the second position P2 of the first picking portion 1 by the second transport portion 27. In this case, the control device H controls the sorter portion 4S such that the first container C1 and the second container C2, which was originally the fourth container C4, that correspond to one piece of order information are successively transported out of the sorter portion 4S. Accordingly, the transport portion 4 is controlled such that the first container C1 and the second container C2 that correspond to one piece of order information are located at the first position P1 and the second position P2 at the same time at the first picking portion 1.

2. Other Embodiments

Next, other embodiments of the picking facility will be described.

(1) In the above embodiment, an exemplary configuration is described in which, if both the first picking operation and the second picking operation are performed, the fourth container C4 in which the target article WT has been housed by the second picking operation is temporarily transported to the first warehouse portion 3A, and housed therein. However, the present disclosure is not limited to such a configuration. For example, if both the first picking operation and the second picking operation are performed, the fourth container C4 in which the target article WT has been housed by the second picking operation may be transported as the second container C2 directly to the first picking portion 1, or be temporarily accumulated at a location other than the first warehouse portion 3A, and thereafter transported as the second container C2 to the first picking portion 1, without being transported to the first warehouse portion 3A.

(2) In the above embodiment, an exemplary configuration is described in which the sorter portion 4S is provided at the transport portion 4. However, the present disclosure is not limited to such a configuration. For example, it is possible to adopt a configuration in which the sorter portion 4S is not provided at the transport portion 4. Specifically, a plurality of first containers C1, and a fourth container C4 in which the target article WT has been housed by the second picking operation may be transported out of the first warehouse portion 3A so as to be arranged for each corresponding piece of the order information. In this case, the first warehouse portion 3A also serves the function of the sorter portion 4S.

(3) In the above embodiment, an exemplary configuration is described in which the first warehouse portion 3A and the second warehouse portion 3B are separate warehouses. However, the present disclosure is not limited thereto. The first warehouse portion 3A and the second warehouse portion 3B may constitute one warehouse. In this case, it is possible to adopt a configuration in which the second container C2 and the fourth container C4 that have been retrieved from the warehouse may pass through the sorter portion 4S, as in the case of the first container C1 and the third container C3, or a configuration in which a bypass path is provided parallel to the sorter portion 4S such that an empty second container C2 or fourth container C4 is transported bypassing the sorter portion 4S.

(4) Note that the configurations disclosed in the embodiments described above are also applicable in combination with configurations disclosed in other embodiments as long as no inconsistency arises. With regard to the other configurations as well, the embodiments disclosed herein are illustrative in all respects. Therefore, various modifications and alterations may be made as appropriate without departing from the gist of the present disclosure.

3. Outline of the Embodiment

In the following, an outline of the picking facility described above will be described.

The picking facility includes: a first picking portion at which an operator performs a first picking operation; a second picking portion at which a robot performs a second picking operation; a housing portion that houses containers; a transport portion that transports the containers; and a control portion that controls the transport portion, wherein the containers include a first container in which articles of an article type to be subjected to the first picking operation are housed, a second container serving as a shipping container, a third container in which articles of an article type to be subjected to the second picking operation are housed, and a fourth container, the first picking operation is an operation in which, based on order information serving as information indicating a target article to be shipped, the target article that has been taken out from the first container is housed in the second container, the second picking operation is an operation in which the target article that has been taken out from the third container is housed in the fourth container based on the order information, and the control portion, if only the first picking operation out of the first picking operation and the second picking operation is performed based on the order information, controls the transport portion such that the first container is transported from the housing portion to the first picking portion; the second container is transported from the housing portion to the first picking portion; and, after the first picking operation has been performed, the second container in which the target article has been housed by the first picking operation is transported to a shipping portion; and, if both the first picking operation and the second picking operation are performed based on the order information, controls the transport portion such that the third container is transported from the housing portion to the second picking portion; the fourth container is transported from the housing portion to the second picking portion; after the second picking operation has been performed, the fourth container in which the target article has been housed by the second picking operation is transported as the second container to the first picking portion; the first container is transported from the housing portion to the first picking portion; and, after the first picking operation has been performed, the second container in which the target articles have been housed by the first picking operation and the second picking operation is transported to the shipping portion.

According to the present configuration, if the target articles indicated in order information include only articles of an article type to be subjected to the first picking operation, only the first picking operation out of the first picking operation and the second picking operation is performed based on the order information. In this case, the first container in which the articles of the article type to be subjected to the first picking operation are housed, and the second container are transported to the first picking portion. Then, as a result of the first picking operation being performed by the operator in a state in which the first container and the second container are located at the first picking portion, all of the target articles indicated in the order information can be housed in the second container, and the second container in which all of the target articles have been housed can be transported to the shipping portion, where a shipping operation can then be performed for the second container.

If the target articles indicated in order information include articles of an article type to be subjected to the first picking operation and articles of an article type to be subjected to the second picking operation, both the first picking operation and the second picking operation are performed. In such a case, first, the third container in which the articles of the article type to be subjected to the second picking operation are housed, and the fourth container are transported to the second picking portion. Then, as a result of the second picking operation being performed by the robot in a state in which the third container and the fourth container are transported to the second picking portion, the articles of the article type to be subjected to the second picking operation, out of the target articles indicated in the order information, can be housed in the fourth container. After the second picking operation has been performed in this manner, the first container in which the articles of the article type to be subjected to the first picking operation are housed, and the second container are transported to the first picking portion. The second container that is transported to the first picking portion in this case is the fourth container in which the target article has been housed by the second picking operation, and the articles of the article type to be subjected to the second picking operation have already been housed therein. Accordingly, as a result of the first picking operation being performed by the operator in a state in which the first container and the second container are located at the first picking portion, all of the target articles indicated in the order information that include both the articles of the article type to be subjected to the first picking operation and the articles of the article type to be subjected to the second picking operation can be housed in the second container. Then, the second container in which all of such target articles have been housed can be transported to the shipping portion, where a shipping operation can then be performed for the second container.

Thus, according to the present configuration, if both the first picking operation and the second picking operation are performed, the articles of the article type to be subjected to the first picking operation and the articles of the article type to be subjected to the second picking operation can be housed in the same second container in the first picking operation performed at the first picking portion. Accordingly, it is possible to simplify the operations as compared with a case where target articles are gathered in one container after being housed in different containers in the first picking operation and the second picking operation.

Here, preferably, the first picking operation is an operation in which the target article that has been taken out from the first container located at a first position is housed in the second container located at a second position that is different from the first position, the transport portion includes a sorter portion that changes an arrangement sequence of the containers that are transported, a first transport portion that transports the first container to the first position along a first path, and a second transport portion that transports the second container to the second position along a second path that is at least partially different from the first path, and the control portion controls the transport portion such that a plurality of the first containers, and a plurality of the second containers including the fourth container in which the target article has been housed by the second picking operation are transported from the housing portion to the sorter portion, the plurality of the first containers and the plurality of the second containers corresponding to a plurality of pieces of the order information; the plurality of the first containers and the plurality of the second containers are transported out in the arrangement sequence that has been changed such that the plurality of the first containers and the plurality of the second containers are arranged for each corresponding piece of the order information in the sorter portion; each of the first containers that have been transported from the sorter portion is transported by the first transport portion; each of the second containers that have been transported from the sorter portion is transported by the second transport portion; and the first containers and the second containers that correspond to one piece of the order information are located at the first position and the second position at the same time at the first picking portion.

According to the present configuration, a plurality of the first containers and a plurality of the second containers that correspond to a plurality of pieces of order information can be sequentially transported such that the first container and the second container that correspond to one piece of order information are located at the first picking portion at the same time. Accordingly, it is possible to appropriately perform the first picking operation, in which articles of an article type to be subjected to the first picking operation are taken out from the first container, and housed in the second container.

In addition, according to the present configuration, a plurality of the first containers and a plurality of second containers including the fourth container in which the target article has been housed by the second picking operation, the first containers and the second containers corresponding to a plurality of pieces of order information, can be transported from the housing portion in random sequence. Accordingly, it is possible to efficiently transport the first containers and the second containers from the housing portion. Also, a plurality of the first containers and a plurality of the second containers can be transported out in the arrangement sequence that has been changed such that the plurality of first containers and the plurality of fourth containers are arranged for each corresponding order information in the sorter portion, and that the first container and the second container that correspond to one piece of order information can be transported such that the first container and the second container are located at the first position and the second position at the same time at the first picking portion. Accordingly, it is also possible to efficiently perform the first picking operation at the first picking portion, while efficiently transporting the first containers and the second containers from the housing portion in the above-described manner.

Preferably, the control portion, if both the first picking operation and the second picking operation are performed based on the order information, controls the transport portion such that, after the second picking operation has been performed first, the fourth container in which the target article has been housed by the second picking operation is temporarily transported to the housing portion and housed therein; and, when the first picking operation is performed thereafter, the fourth container is transported as the second container to the first picking portion.

According to the present configuration, the fourth container in which the target article has been housed by the second picking operation is temporarily housed in the housing portion, and therefore any buffer portion for temporarily accumulating the fourth container does not need to be provided midway in the transport path from the first picking portion to the second picking portion, unlike a case where the fourth container is transported as the second container from the first picking portion directly to the second picking portion. Accordingly, it is possible to simplify the picking facility.

Preferably, the control portion, if only the second picking operation out of the first picking operation and the second picking operation is performed based on the order information, controls the transport portion such that the third container is transported from the housing portion to the second picking portion; the fourth container is transported from the housing portion to the second picking portion; and, after the second picking operation has been performed, the fourth container in which the target article has been housed by the second picking operation is transported to the shipping portion.

According to the present configuration, if the target articles indicated in order information include only articles of an article type to be subjected to the second picking operation, only the second picking operation out of the first picking operation and the second picking operation is performed based on the order information. In such a case, the third container in which the articles of the article type to be subjected to the second picking operation have been housed, and the fourth container are transported to the second picking portion. Then, as a result of the second picking operation being performed by the robot in a state in which the third container and the fourth container are located at the second picking portion, all of the target articles indicated in the order information can be housed in the fourth container, and the fourth container in which all of the target articles have been housed can be transported to the shipping portion, where a shipping operation can then be performed for the fourth container.

INDUSTRIAL APPLICABILITY

The technique according to the present disclosure is applicable to a picking facility including a picking portion at which an operator performs a picking operation.

What is claimed is:

1. A picking facility comprising:
a first picking portion at which an operator performs a first picking operation;
a second picking portion at which a robot performs a second picking operation;
a housing portion that houses containers;
a transport portion that transports the containers along a transport path; and
a control portion that controls the transport portion, wherein:
the containers include a first container in which articles of an article type to be subjected to the first picking operation are housed, a second container serving as a shipping container, a third container in which articles of an article type to be subjected to the second picking operation are housed, and a fourth container,
the first picking operation is an operation in which, based on order information serving as information indicating a target article to be shipped, the target article that has been taken out from the first container is housed in the second container,
the second picking operation is an operation in which the target article that has been taken out from the third container is housed in the fourth container based on the order information,
the housing portion is upstream of the first picking portion and the second picking portion on the transport path,
the transport path includes a first path portion connecting the housing portion with the first picking portion and a second path portion connecting the housing portion with the second picking portion, the first and second path portions being parallel to each other, and
the control portion, if only the first picking operation out of the first picking operation and the second picking operation is performed based on the order information, controls the transport portion such that:
the first container is transported from the housing portion to the first picking portion;
the second container is transported from the housing portion to the first picking portion and, after the first picking operation has been performed, the second container in which the target article has been housed by the first picking operation is transported to a shipping portion; and
if both the first picking operation and the second picking operation are performed based on the order information, the control portion controls the transport portion such that:
the third container is transported from the housing portion to the second picking portion;
the fourth container is transported from the housing portion to the second picking portion;

after the second picking operation has been performed, the fourth container in which the target article has been housed by the second picking operation is temporarily transported from the second picking portion to the housing portion and housed in the housing portion, and is then transported as the second container to the first picking portion;
the first container is transported from the housing portion to the first picking portion; and
after the first picking operation has been performed, the second container in which the target articles have been housed by the first picking operation and the second picking operation is transported to the shipping portion.

2. The picking facility according to claim 1, wherein:
the control portion, if both the first picking operation and the second picking operation are performed based on the order information, controls the transport portion such that
when the first picking operation is performed thereafter, the fourth container is transported as the second container to the first picking portion.

3. The picking facility according to claim 1, wherein:
the control portion, if only the second picking operation out of the first picking operation and the second picking operation is performed based on the order information, controls the transport portion such that:
the third container is transported from the housing portion to the second picking portion;
the fourth container is transported from the housing portion to the second picking portion; and
after the second picking operation has been performed, the fourth container in which the target article has been housed by the second picking operation is transported to the shipping portion.

4. The picking facility according to claim 1, wherein the housing portion comprises:
a first warehouse portion that houses the first container and the third container and that is capable of housing the fourth container; and
a second warehouse portion that houses the second container and the fourth container in each of which no article is housed, and
in a case where both the first picking operation and the second picking operation are performed based on the order information, the control portion, after the second picking operation is performed, controls the transport portion such that the fourth container in which the target article has been housed by the second picking operation is temporarily transported to the first warehouse portion, and is then housed in the first warehouse portion.

5. The picking facility according to claim 1, wherein the transport portion comprises a sorter portion that changes an arrangement sequence of the containers that are transported, and
in a case where the order information includes a plurality of pieces of the order information, the control portion controls the transport portion such that the transport portion transports from the housing portion to the sorter portion a plurality of the first container and a plurality of the second container corresponding to the plurality of pieces of the order information, the plurality of the second container including the fourth container in which the target article has been housed by the second picking operation, the sorter portion changes the arrangement sequence of the plurality of the first container and the plurality of the second container according to the plurality of pieces of the order information and transports out the plurality of the first container and the plurality of the second container, and the transport portion then transports the plurality of first container and the plurality of second container to the first picking portion.

6. The picking facility according to claim 1, wherein in a case where both the first picking operation and the second picking operation are performed based on the order information, the control portion controls the transport portion such that the transport portion transports the fourth container from the housing portion to the second picking portion along a path that is at least partially different from a path along which the third container is transported.

7. A picking facility comprising:
a first picking portion at which an operator performs a first picking operation;
a second picking portion at which a robot performs a second picking operation;
a housing portion that houses containers;
a transport portion that transports the containers; and
a control portion that controls the transport portion, wherein:
the containers include a first container in which articles of an article type to be subjected to the first picking operation are housed, a second container serving as a shipping container, a third container in which articles of an article type to be subjected to the second picking operation are housed, and a fourth container,
the first picking operation is an operation in which, based on order information serving as information indicating a target article to be shipped, the target article that has been taken out from the first container located at a first position is housed in the second container located at a second position that is different from the first position,
the second picking operation is an operation in which the target article that has been taken out from the third container is housed in the fourth container based on the order information,
the transport portion includes a sorter portion that changes an arrangement sequence of the containers that are transported, a first transport portion that transports the first container to the first position along a first path, and a second transport portion that transports the second container to the second position along a second path that is at least partially different from the first path,
the control portion, if only the first picking operation out of the first picking operation and the second picking operation is performed based on the order information, controls the transport portion such that:
the first container is transported from the housing portion to the first picking portion;
the second container is transported from the housing portion to the first picking portion; and
after the first picking operation has been performed, the second container in which the target article has been housed by the first picking operation is transported to a shipping portion,
if both the first picking operation and the second picking operation are performed based on the order information, controls the transport portion such that:
the third container is transported from the housing portion to the second picking portion;
the fourth container is transported from the housing portion to the second picking portion;
after the second picking operation has been performed, the fourth container in which the target article has been housed by the second picking operation is transported as the second container to the first picking portion;
the first container is transported from the housing portion to the first picking portion; and
after the first picking operation has been performed, the second container in which the target articles have been housed by the first picking operation and the second picking operation is transported to the shipping portion, and
the control portion controls the transport portion such that:
a plurality of the first containers, and a plurality of the second containers including the fourth container in which the target article has been housed by the second picking operation are transported from the housing portion to the sorter portion, the plurality of the first containers and the plurality of the second containers corresponding to a plurality of pieces of the order information;
the plurality of the first containers and the plurality of the second containers are transported out in the arrangement sequence that has been changed such that the plurality of the first containers and the plurality of the second containers are arranged for each corresponding piece of the order information in the sorter portion;
each of the first containers that have been transported from the sorter portion is transported by the first transport portion;
each of the second containers that have been transported from the sorter portion is transported by the second transport portion; and
the first containers and the second containers that correspond to one piece of the order information are located at the first position and the second position at the same time at the first picking portion.

8. A picking facility comprising:
a first picking portion at which an operator performs a first picking operation;
a second picking portion at which a robot performs a second picking operation;
a housing portion that houses containers;
a transport portion that transports the containers; and
a control portion that controls the transport portion, wherein:
the containers include a first container in which articles of an article type to be subjected to the first picking operation are housed, a second container serving as a shipping container, a third container in which articles of an article type to be subjected to the second picking operation are housed, and a fourth container,
the first picking operation is an operation in which, based on order information serving as information indicating a target article to be shipped, the target article that has been taken out from the first container located at a first position is housed in the second container located at a second position that is different from the first position,
the second picking operation is an operation in which the target article that has been taken out from the third container is housed in the fourth container based on the order information,
the housing portion is upstream of the first picking portion and the second picking portion on the transport path, the transport path includes a first path portion connecting the housing portion with the first picking portion and a second path portion connecting the housing portion with the second picking portion, the first and second path portions being parallel to each other, the control portion, if only the first picking operation out of the first picking operation and the second picking operation is performed based on the order information, controls the transport portion such that:

the first container is transported from the housing portion to the first picking portion;

the second container is transported from the housing portion to the first picking portion; and, after the first picking operation has been performed, the second container in which the target article has been housed by the first picking operation is transported to a shipping portion; and, if both the first picking operation and the second picking operation are performed based on the order information, controls the transport portion such that:

the third container is transported from the housing portion to the second picking portion;

the fourth container is transported from the housing portion to the second picking portion;

after the second picking operation has been performed, the fourth container in which the target article has been housed by the second picking operation is transported from the second picking portion to upstream of the first picking portion and the second picking portion, and is then transported as the second container to the first picking portion;

the first container is transported from the housing portion to the first picking portion; and after the first picking operation has been performed, the second container in which the target articles have been housed by the first picking operation and the second picking operation is transported to the shipping portion.

* * * * *